United States Patent [19]

Kiyama et al.

[11] Patent Number: 4,675,824
[45] Date of Patent: Jun. 23, 1987

[54] METHOD OF REPLACING A TOLLING SYSTEM FOR TOLL ROADS

[75] Inventors: Yoshito Kiyama; Ryokichi Wada; Kingo Sakamoto, all of Kobe, Japan

[73] Assignee: Mitsubishi Jukogyo Kabushiki Kaisha, Japan

[21] Appl. No.: 767,713

[22] Filed: Aug. 20, 1985

Related U.S. Application Data

[63] Continuation-in-part of Ser. No. 372,036, Apr. 26, 1982, abandoned.

[30] Foreign Application Priority Data

May 1, 1981 [JP] Japan ................................. 56-066552

[51] Int. Cl.⁴ ............................................. G06F 15/48
[52] U.S. Cl. ..................................... 364/464; 340/51; 235/384; 194/901
[58] Field of Search .................... 364/464, 467; 377/9; 340/51; 194/901, 902; 235/384

[56] References Cited

U.S. PATENT DOCUMENTS

| | | | |
|---|---|---|---|
| 3,674,992 | 7/1972 | Kirkham et al. | 377/9 |
| 3,705,976 | 12/1972 | Platzman | 340/51 |
| 3,794,966 | 2/1974 | Platzman | 340/51 |
| 4,288,688 | 9/1981 | Kiyama et al. | 235/384 |
| 4,303,904 | 12/1981 | Chasek | 340/51 |
| 4,357,530 | 11/1982 | Rose et al. | 235/384 |

Primary Examiner—Gary Chin
Attorney, Agent, or Firm—Toren, McGeady and Goldberg

[57] ABSTRACT

A method of replacing a punched-card tolling system with a magnetic-card tolling system gradually by installing controllers sequentially at entrance and exit gates, each of which controllers is capable of controlling the terminals for both of these two tolling systems simultaneously.

1 Claim, 20 Drawing Figures

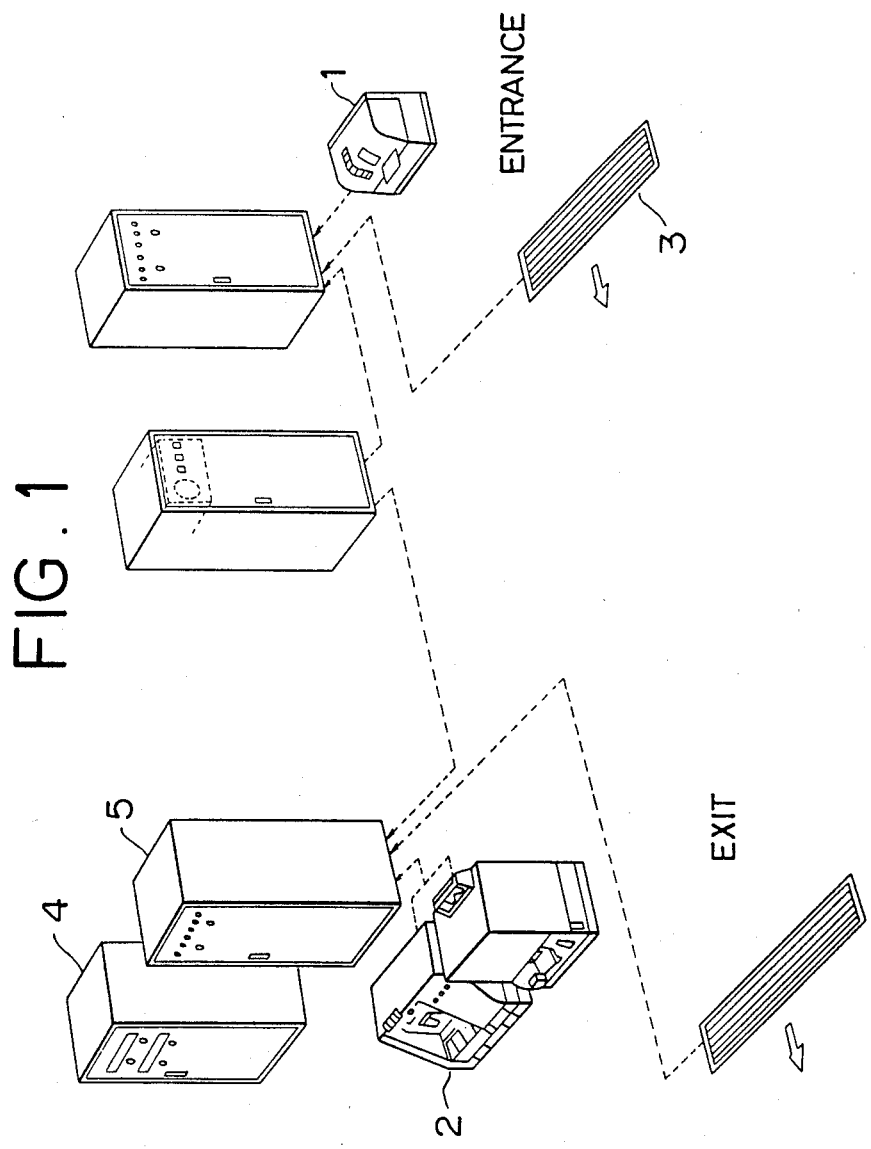

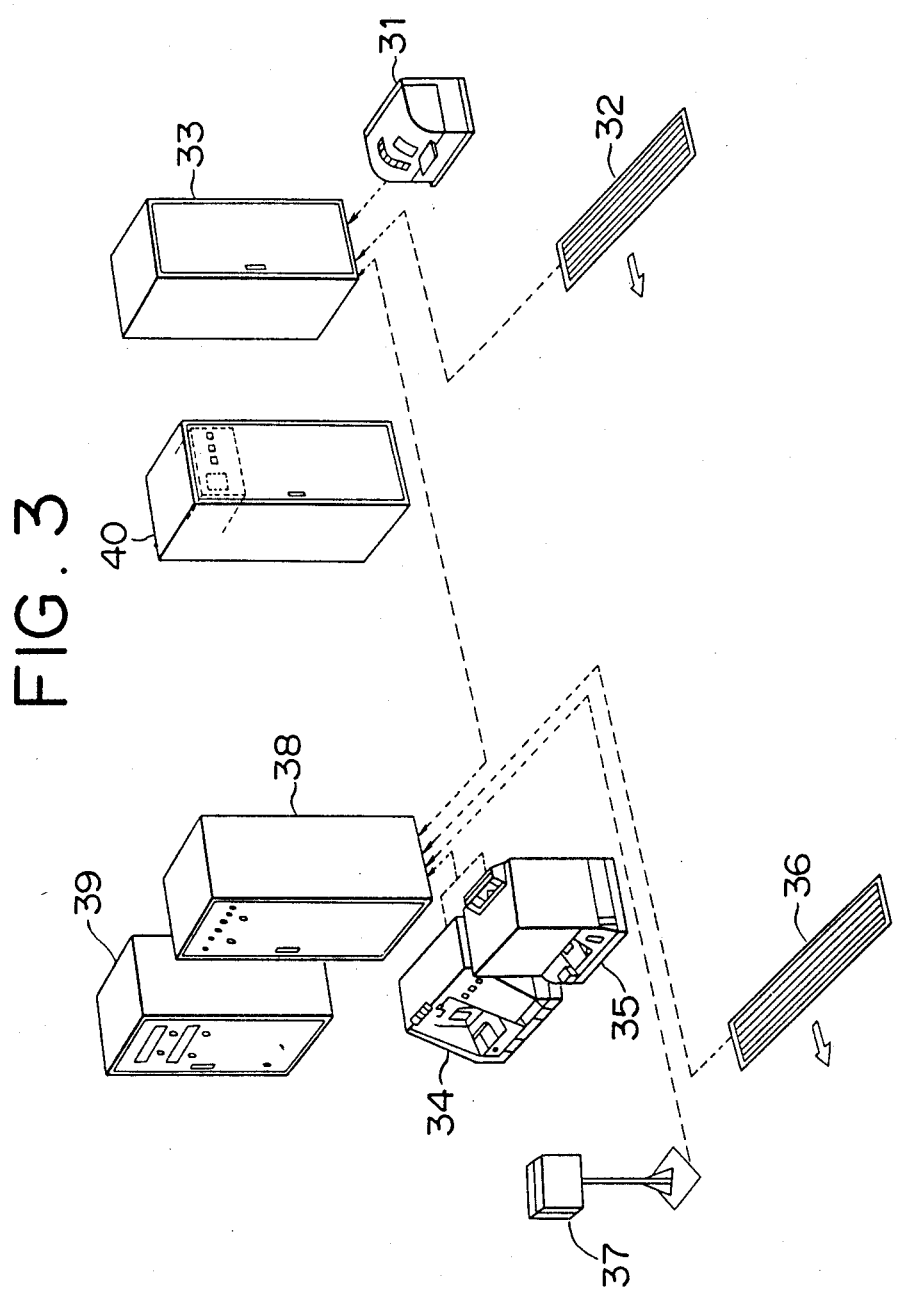

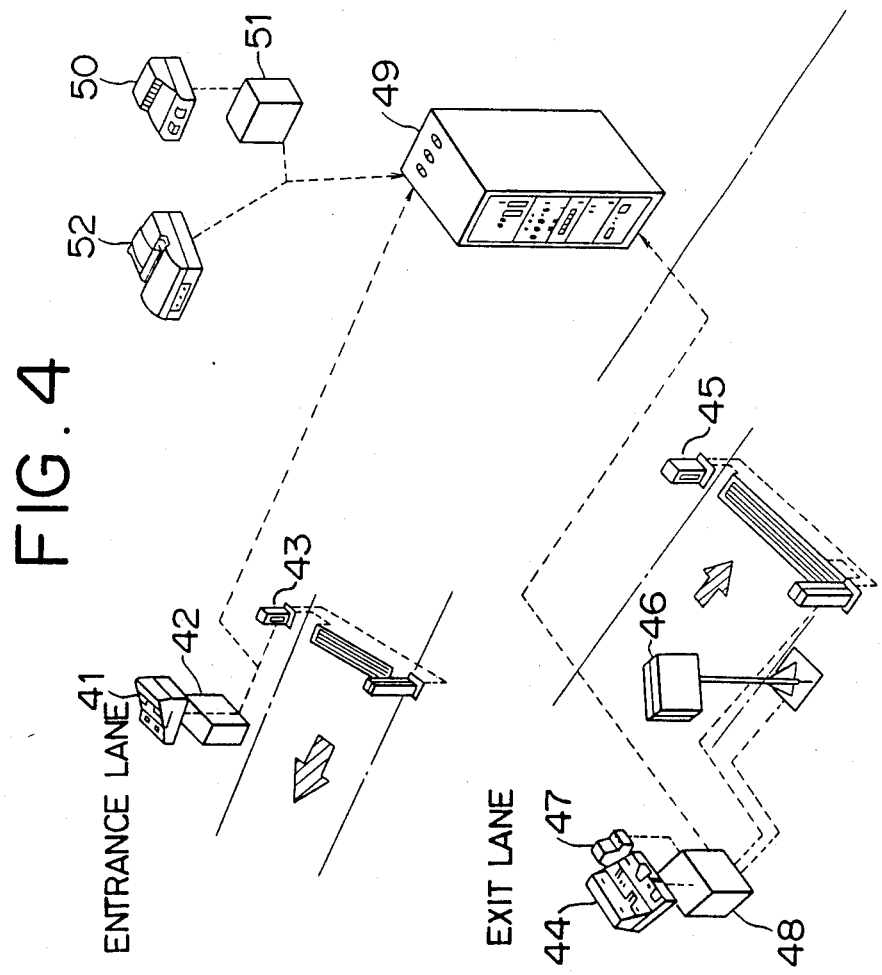

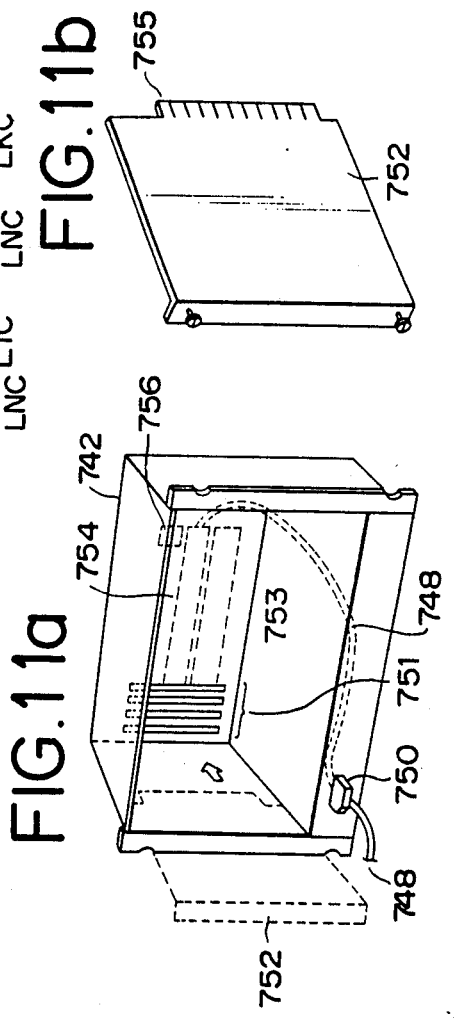

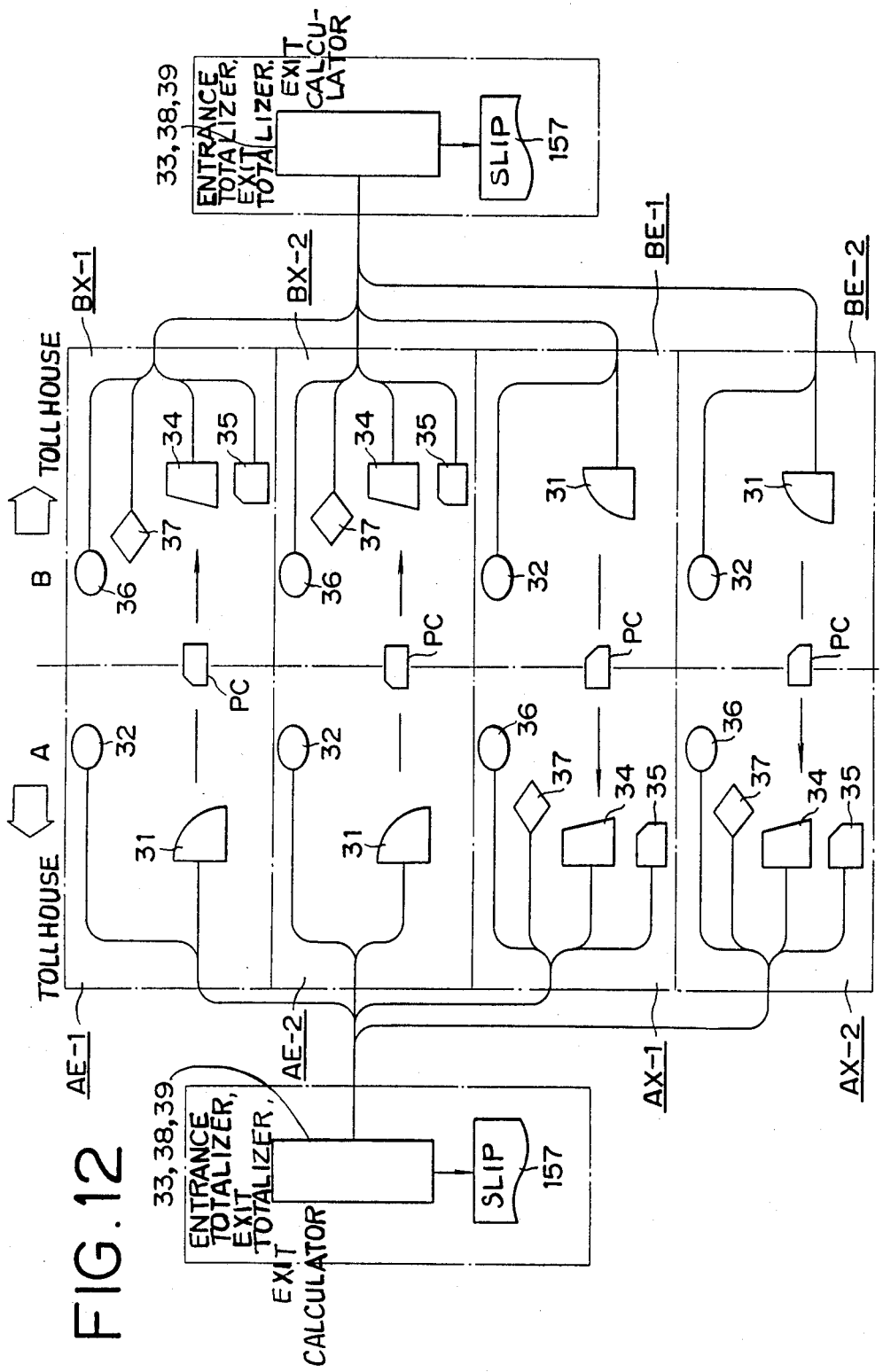

METHOD OF REPLACING A TOLLING SYSTEM FOR TOLL ROADS

This application is a continuation-in-part application of application Ser. No. 372,036 filed Apr. 26, 1982 now abandoned.

BACKGROUND OF THE INVENTION

1. Field of the Invention

This invention relates to a tolling system for toll roads.

2. Description of the Prior Art

On a multi-section toll road, a pass is handed at an entrance gate of each tollhouse to the driver of a vehicle entering the gate, on which pass data on the vehicle including a tollgate number and the type of the vehicle are recorded, and the driver then hands the pass to a clerk at an exit gate. The clerk at the exit gate processes the pass to determine information for the vehicle with reference to the tollgate number recorded thereon, and calculate the toll on the basis of the type of the vehicle, and to receive the toll in cash from the driver or to charge it to the account of the owner of the vehicle.

In a conventional tolling system for such a multi-section toll road, a punched card is generally used as a pass.

The conventional punched-card system is to be shifted wholly in the future to a new magnetic-card system, in which a miniaturized pass is used, which can be processed easily at high speed by an electronic computer. On newly-constructed toll roads, a magnetic-card system is employed from the first, and, therefore, no problem in changing over is present. On the other hand, in an existing toll road, in which a punched-card system is employed, it is necessary that the punched-card system be changed over to a magnetic-card system. It is practically impossible to shift a punched-card system to a magnetic-card system with the toll road closed completely; it is necessary that the punched-card system be shifted to a magnetic-card system gradually as the tolling system as a whole is kept operational. It takes a considerably long period of time to complete the shifting from one tolling system to another. Moreover, there are operational problems in many respects in shifting from one tolling system to the other while keeping the toll road in operation.

SUMMARY OF THE INVENTION

The present invention has been developed in view of the above-mentioned circumstances.

An object of the present invention is to provide a method of replacing a new tolling system for toll roads, which avoids the above-mentioned problems included in shifting from a conventional punched-card system to a new magnetic-card system.

The above and other objects as well as advantageous features of the invention will become apparent from the following description of a preferred embodiment taken in conjunction with the accompanying drawings.

BRIEF DESCRIPTION OF THE DRAWINGS

FIG. 1 is a perspective view of an arrangement of machines in a conventional punched-card tolling system;

FIG. 3 illustrates an example of a complete tolling system based on the arrangement shown in FIG. 1;

FIG. 4 illustrates an example of a complete tolling system based on the arrangement shown in FIG. 2;

FIG. 10 is a construction diagram of the double lane controller;

FIGS. 11a and 11b illustrate a circuit board storage rack in the double lane controller; and FIGS. 12–16 illustrate the sequence of a tolling system-replacing operation.

DESCRIPTION OF THE PREFERRED EMBODIMENT

In a conventional punched-card system, the toll is determined and collected in the following manner.

Figures 1, 14:
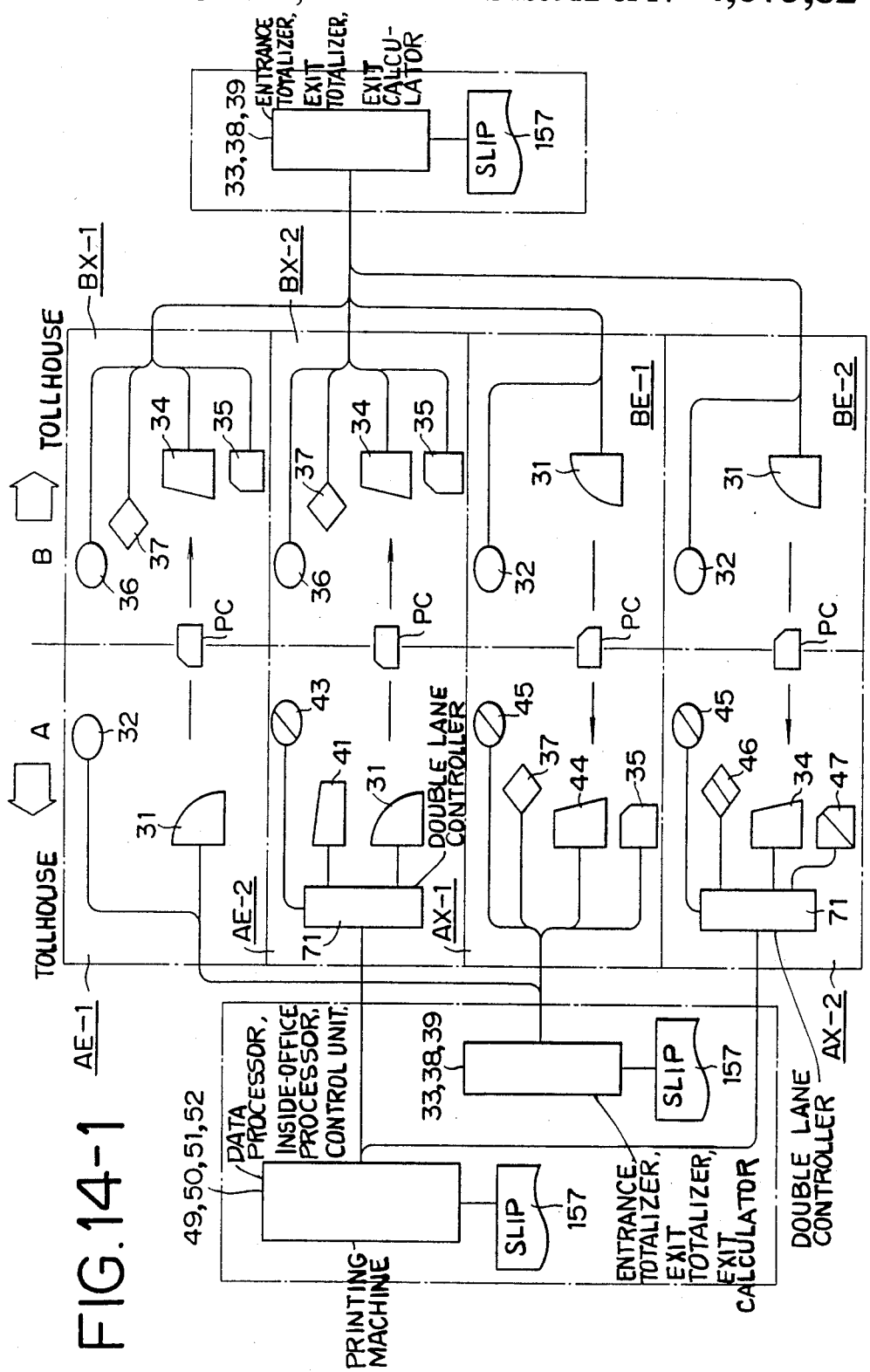
Figures 2, 14:
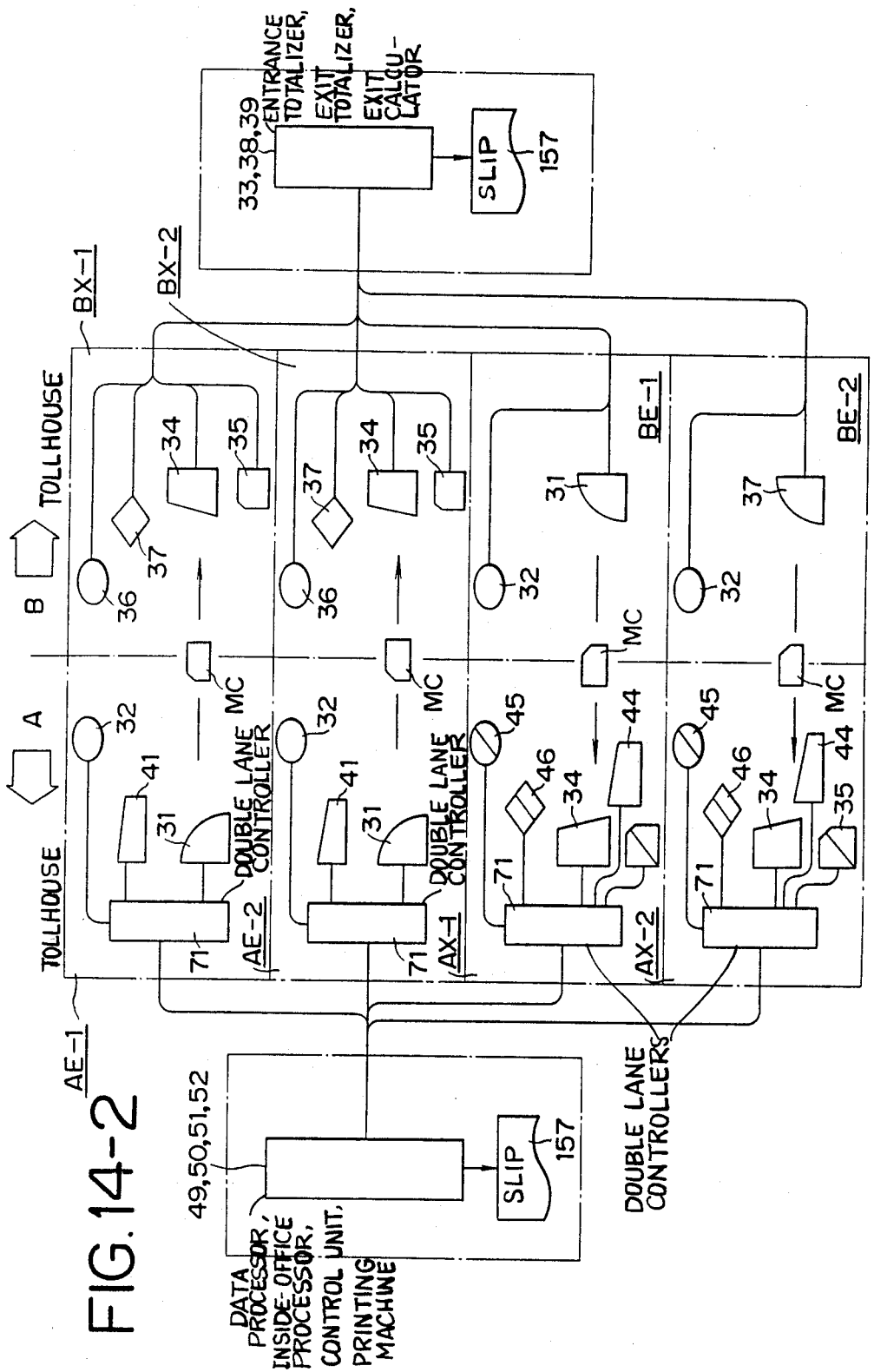

As shown in FIG. 1, a pass delivery machine 1 is disposed at an entrance booth (entrance gate) of a tollhouse, and a pass examining machine 2 at an exit booth (exit gate) of another tollhouse. A clerk in the entrance booth, who visually recognizes an incoming vehicle, presses buttons, which are provided on the pass delivery machine, for inputting the type of the vehicle and the number of axles thereof. The pass delivery machine 1 is adapted to typewrite on a pass the relative tollgate number, booth number (lane number), and clerk number, which have been inputted thereinto in advance, and the vehicle type number, number of axles of the vehicle, time and date of entry of the vehicle, and serial number of the pass, which have been newly inputted thereinto; and to punch the pass for recording therein the information including the tollgate number, vehicle type number, and number of axles of the vehicle, the resulting pass being delivered. The pass thus issued by the pass delivery machine 1 is handed by the clerk to the driver in the vehicle at the entrance booth. The clerk number referred to above is the code of a person in charge in the booth, and key-inputted when he begins to work. In each entrance gate, weighing boards 3, the number of which is in agreement with that of the booths, are provided. Each of the weighing boards 3 is adapted to be actuated by the pressure applied thereto by the wheels of a vehicle which rolls over the boards and to generate an output representative of the detected weight. While a vehicle rolls over the weighing board 3, the number of axles (corresponding to the number of the axles of the vehicle on the weighing board) thereof is detected. The detected number of axles of the vehicle as well as the data recorded on a pass by the pass delivery machine are sent to a totalizing recorder at the entrance booth to be registered on recording paper. The data on the recording paper are checked with the total number of passes issued, which is shown on a reference note prepared by the clerk at the end of his work.

At an exit booth, a clerk in charge receives a pass from the driver of an incoming vehicle and inserts the same into a slit in a pass examining machine at the exit booth. The pass examining machine at the exit booth is adapted to read the information punch-recorded on the pass, such as the tollgate number, vehicle type number, and number of axles of the vehicle, and send the data to a calculator in the exit booth, which is used for determining the toll. The clerk receives the toll, which is in accordance with an amount determined by the calculator, from the driver in the vehicle mentioned above.

The pass examining machine at the exit booth is adapted to typewrite on the pass, which is inserted thereinto, the necessary data including the relative exit tollgate number, vehicle type number, clerk number, and time and date of leaving of the toll road, and punch-recording therein the exit tollgate number and clerk number, the resulting pass being delivered. In the exit gate, weighing boards, the number of which is in agreement with that of the booths, are also provided. The number of axles of the vehicle read from the pass, number of axles of the same vehicle detected while the vehicle rolls over the weighing board, the amount of the toll calculated, and the number of vehicles are registered on a totalizer 5 at the exit booth.

When the above-described normal pass-processing operation cannot be carried out at the exit booth, for example, when a pass is broken or lost, or when the incoming vehicle is a police car or a free pass vehicle, the clerk is to prepare a reference note after he has finished his work.

The three pieces of paper, i.e., the reference note mentioned above, the pass, on which various data have been recorded in the pass examining machine at the exit booth, and the recording paper delivered by the totalizer at the exit are compared with one another. Such documents are carried to the calculation center by a collecting car periodically. The reference notes collected are set on a card by a puncher, and the resulting reference notes and passes collected are inspected by an electronic computer. At the same time, a monthly report on income and a statistic report on traffic volume are prepared on the basis of the collected documents.

On the other hand, in the new tolling system, i.e., the magnetic-card system, a tolling operation is carried out by using as a pass a magnetic card instead of a conventional eighty-column card. For example, the information on a vehicle may be recorded on a pass erroneously due to an erroneous operation of the pass delivery machine, so that it becomes necessary to reissue the pass. A pass may fail to be handed to the driver of a vehicle. Also, there is the possibility that a clerk at an exit booth receives a broken pass or is told that the driver of a vehicle arriving at the exit booth has lost his pass. In such cases, a tolling operation and the collection of data are carried out manually. The magnetic-card system permits in such cases inputting data into the terminals in the booth to speed up the tolling operation. It also permits collecting an increased amount of data.

Figure 2:
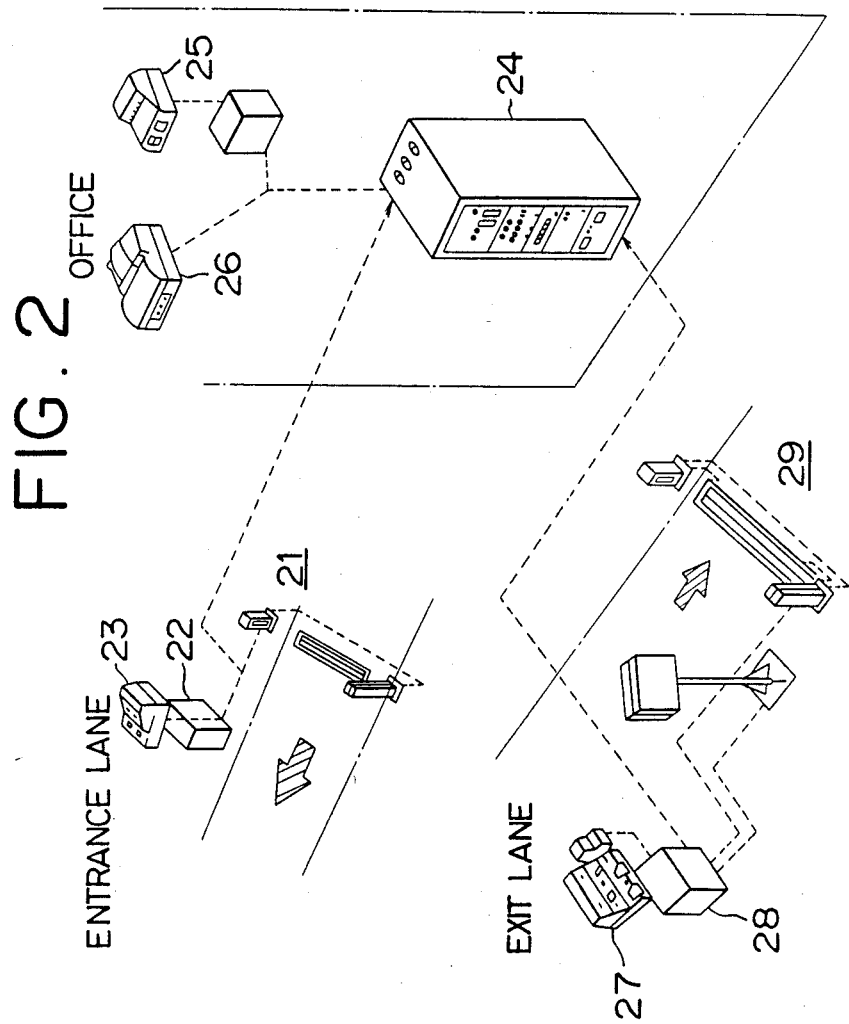
FIG. 2 is a perspective view of an arrangement of machines in a new magnetic-card type tolling system.

The magnetic-card system will now be described. As shown in FIG. 2, the type and number of axles of an incoming vehicle are detected automatically by a vehicle discriminator 21 at an entrance gate, and the data on the vehicle are sent to a lane controller 22. The data as well as the relative toll gate number, booth number (lane number) and clerk number, which have been inputted into the controller 22 in advance, are sent therefrom to a pass delivery machine 23 by means of a signal passing through a vehicle separator not shown. A pass consisting of a magnetic card is then delivered automatically by the machine 23. At this time, the information including the tollgate number, booth number, clerk number, number of axles of the vehicle and serial number of the pass are typewritten on the pass and also magnetically recorded on a magnetic stripe. The pass thus issued is handed by the clerk to the driver of the vehicle.

The lane controller 22 is adapted to transmit the abovementioned information to a data processor 24 every time a pass is delivered. Both the lane controller 22 and data processor 24 are adapted to collect and record such data independently. The lane controller 22 is also adapted to issue automatically at the end of the on-duty hour of the clerk a service record card, on which the data from the pass delivery machine 23 are typewritten and magnetically recorded as the service data.

The clerk carries the service record card to the tolling office to check the same and insert it into a processor 25 in the office. When it is necessary to correct the data on the service record card, correction data are inputted from a control board for the processor 25 to be sent to the data processor 24. In the data processor 24, the collected data and correction data are edited to check the same, and the resulting data are printed on recording paper by a printing machine, such as a printer.

At an exit booth, a clerk receives a pass from the driver of a vehicle entering the same, and inserts the pass into a slit in a pass examining machine 27. In the pass examining machine 27, the tollgate number, vehicle type number and time of entry are read and displayed on an indicator. When there is an error on the pass issued at the entrance booth, it is corrected in the pass examining machine 27, and the resulting data are sent to a lane controller 28. In the lane controller 28, the toll is calculated, and the result is displayed on an indicator in the pass examining machine 27. The clerk receives the toll from the driver of the vehicle. In the pass examining machine 27, the relative tollgate number, vehicle type number, clerk number, and time of arrival of the vehicle are typewritten and magnetically recorded on the pass, the resulting pass being delivered therefrom.

At the exit gate, vehicle discriminators 29, the number of which is in agreement with that of booths, are also provided. The type of vehicle determined by the vehicle discriminator 29 and the type of vehicle recorded magnetically on the pass are compared with each other by the clerk to ascertain that the type of vehicle corrected in the pass examining machine 27 is proper.

When the above normal processing operation cannot be carried out at an exit booth, for example, the pass is found broken or lost or when the vehicle arriving at the exit booth is a police car, a vehicle of U.S. forces, or a free pass vehicle, the necessary data are inputted by operating a function key and a ten key on the control board on the pass examining machine 27. For example, when the data magnetically recorded on a broken pass cannot be read, the typewritten items thereon are visually checked, and a function key for broken pass is pressed. The information including the tollgate number and vehicle type number is then inputted. The information on the pass, data inputted by the clerk and data from the vehicle discriminator 29 are edited in the lane controller and sent out to the data processor 24. A service record card is prepared in the exit booth in the same manner as in the entrance booth at the end of the on-duty hour of the clerk. The service record card is inserted into the processor 25 in the office. Only such data that are corrected and ascertained in the processor 25 are sent to the data processor and printed by the printing machine 26 consisting of a printer. The resulting data are checked. In the processor 25 in the office, the accumulated data are printed periodically in the form of a report on monthly income and a statistic report on the traffic volume, registered on a floppy disc, and sent to an electronic computer in the calculation center by an on-line transmission system.

The conventional tolling system described previously is to be replaced wholly in the future by the new magnetic-card system, in which a miniaturized pass is used, which can be processed easily at a high speed by an electronic computer. On a newly-constructed toll road, a magnetic-card system is employed from the first, and, therefore, no replacement problems occur. On the other hand, in an existing toll road, in which a punched-card system is employed, it is necessary that the punched-card system be replaced by a magnetic-card system. It is practically impossible to completely close a toll road to replace a punched-card system with a magnetic-card system; it is necessary that the punched-card system be replaced by a magnetic-card system gradually as the tolling system as a whole is kept operational. It takes a considerably long period of time to complete the replacement of the tolling systems. Moreover, it presents problems in many respects to shift from one tolling system to another while keeping the toll road in operation.

The present invention has been developed in view of the above-mentioned circumstances.

An object of the present invention is to provide a method of replacing a tolling system for toll roads, which solves the above-mentioned problems included in shifting a conventional punched-card system to a new magnetic card system.

The method according to the present invention is used to install a new tolling system for toll roads, which system includes terminals installed in a booth at an entrance gate and adapted to issue a pass with entrance information including a toll office number and type of vehicle recorded thereon, terminals installed in a booth at an exit gate and adapted to read the information on the pass, a means for determining an amount of toll on the basis of the information on the pass, which has been read by the terminals at the exit gate, and a data collector separately provided to process the data, the method comprising the steps of setting in order in entrance and exit gates control units capable of controlling old and new terminals simultaneously, to connect the old and new terminals replacing of the pass issuing from the old type pass by the old terminals at the entrance gate to the new type passes by the new terminals after completion of installation of all terminals, and finally removing the terminals for the old system at the entrance and exit gates.

An embodiment of the present invention will now be described with reference to the accompanying drawings.

Figures 3, 14:
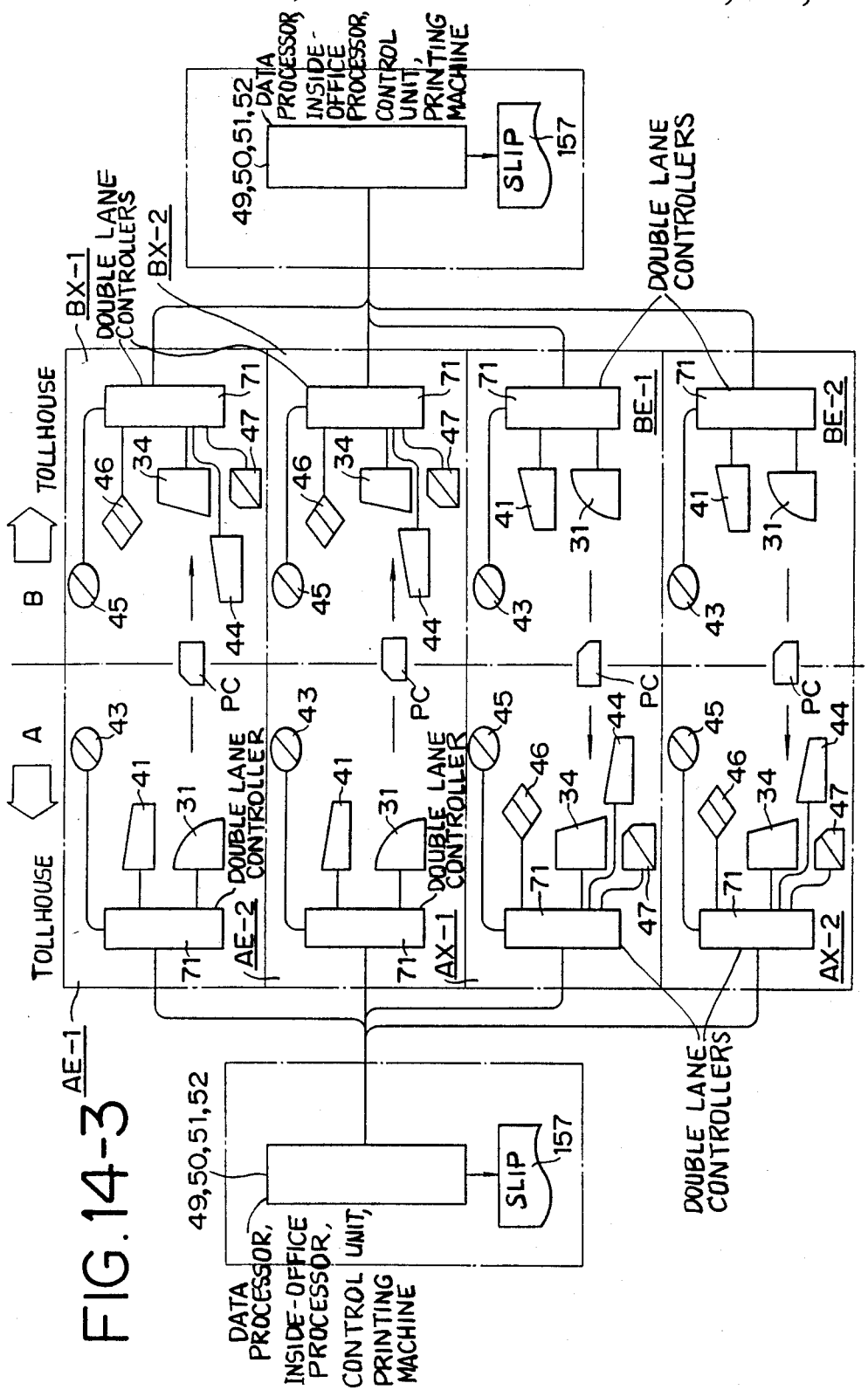

FIG. 3 shows an example of a punched-card system. Referring to the drawing, reference numeral 31 denotes a punched card type pass delivery machine, 32 a weighing board laid on the road surface and operated in accordance with the pressure of a vehicle rolling thereon, to detect the passage and number of axles of a vehicle, 33 an entrance totalizer adapted to totalize and record the data registered on a pass at the entrance and the number of axles of a vehicle passing the entrance, which is detected by the weighing board 32, 34 a reader for a punched card type pass, which is provided in each of the booths at the exit gate, and which is adapted to read the contents of the pass, 35 a receipt issuing machine, 36 a weighing board provided at the exit and having the same functions as the weighing board 32 referred to above, 37 an indictor for utilizers provided on a road by the booth at the exit gate and adapted to display the toll of a utilizer thereon, 38 an exit totalizer adapted to totalize and record at the exit the data read from a pass, data on the amount of money handled, and number of axles of a vehicle passing the exit, 39 an exit calculator adapted to determine the toll by a signal from the reader 34 for punched card type pass, and 40 an emergency back-up power source device used during the stoppage of power supply. All of the entrance totalizer 33, exit totalizer 38, exit calculator 39 and emergency power source device 40 are installed in the relative offices.

FIG. 4 shows an example of a magnetic-card system. Referring to the drawing, reference numeral 41 denotes a magnetic pass delivery machine installed in each booth, 42 a lane controller installed in each booth to control the terminals of the magnetic pass delivery machine and transmit the collected data to a data processor 49, which will be described later, 43 a vehicle discriminator consisting of a combination of a weighing board and a plurality of phototubes, 44 a reader for magnetic pass, which is installed in each booth at the exit gate, 45 a vehicle discriminator similar to the vehicle discriminator 43, 46 a toll indicator, 47 a receipt issuing machine, 48 a lane controller installed in each booth at the exit and adapted to control the toll indicator 46 and receipt issuing machine 47 and transmit collected data to the data processor 49, which is installed in the toll office and connected to the entrance and exit lane controllers 42, 48 to receive the data collected thereby, 52 a printing machine adapted to prepare the necessary slips on the basis of the data received by the processor 49, 50 a processor also installed in the office, into which supplementary data are inputted after the on-duty hour of each clerk has terminated, and 51 a control unit for the processor in the office, which is adapted to transmit the above-mentioned data to the data processor 49, which data are to constitute a part of the data on slips to be prepared later.

Figure 5:
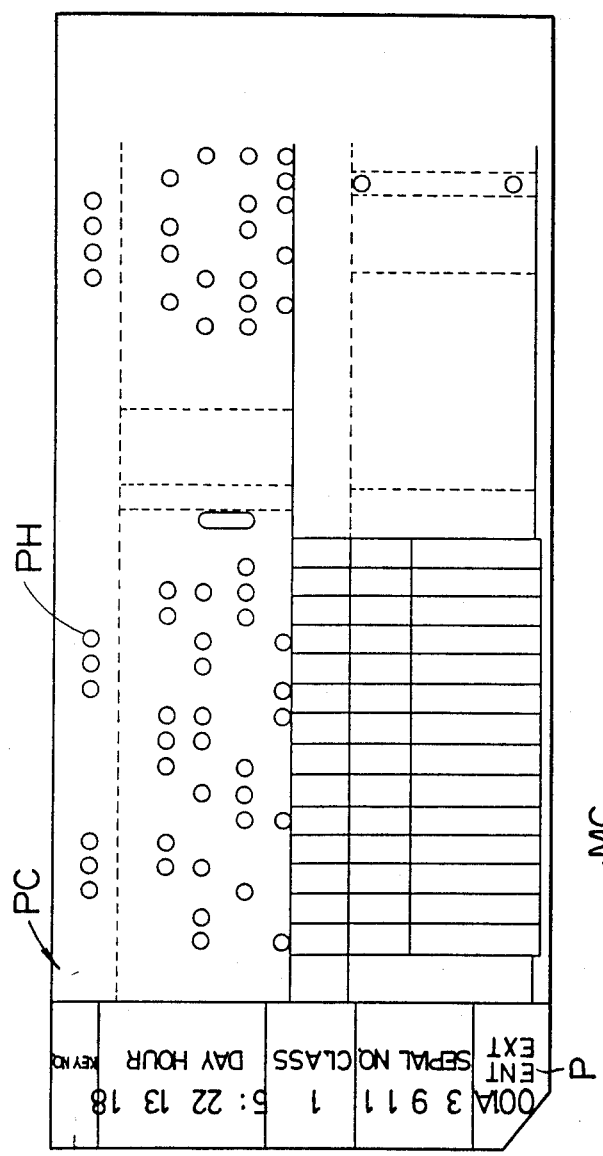
FIG. 5 shows a pass used for the punch-card system.

FIG. 5 shows an example of a pass PC used in the punched card system. The pass PC consists of a generally-used eighty-column card having typewritten letters and figures P representing a tollgate number, the type of vehicle, etc., and punched holes PH.

Figure 6:
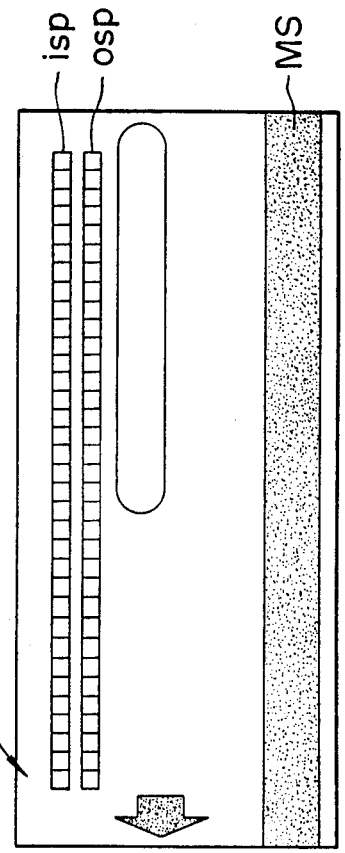
FIG. 6 shows a pass used for the magnetic-card system.

FIG. 6 shows an example of a pass MC used in the magnetic card system. The pass MC consists of a rectangular card having a magnetic stripe MS extending on the front surface thereof in the direction of the length thereof and adapted to record information thereon, a blank space ISP having columns, in which entrance information including a toll gate number, type of vehicle, clerk number, serial number, and time and date are to be typewritten, and a blank space OSP, in which exit information is to be typewritten.

Figure 7:
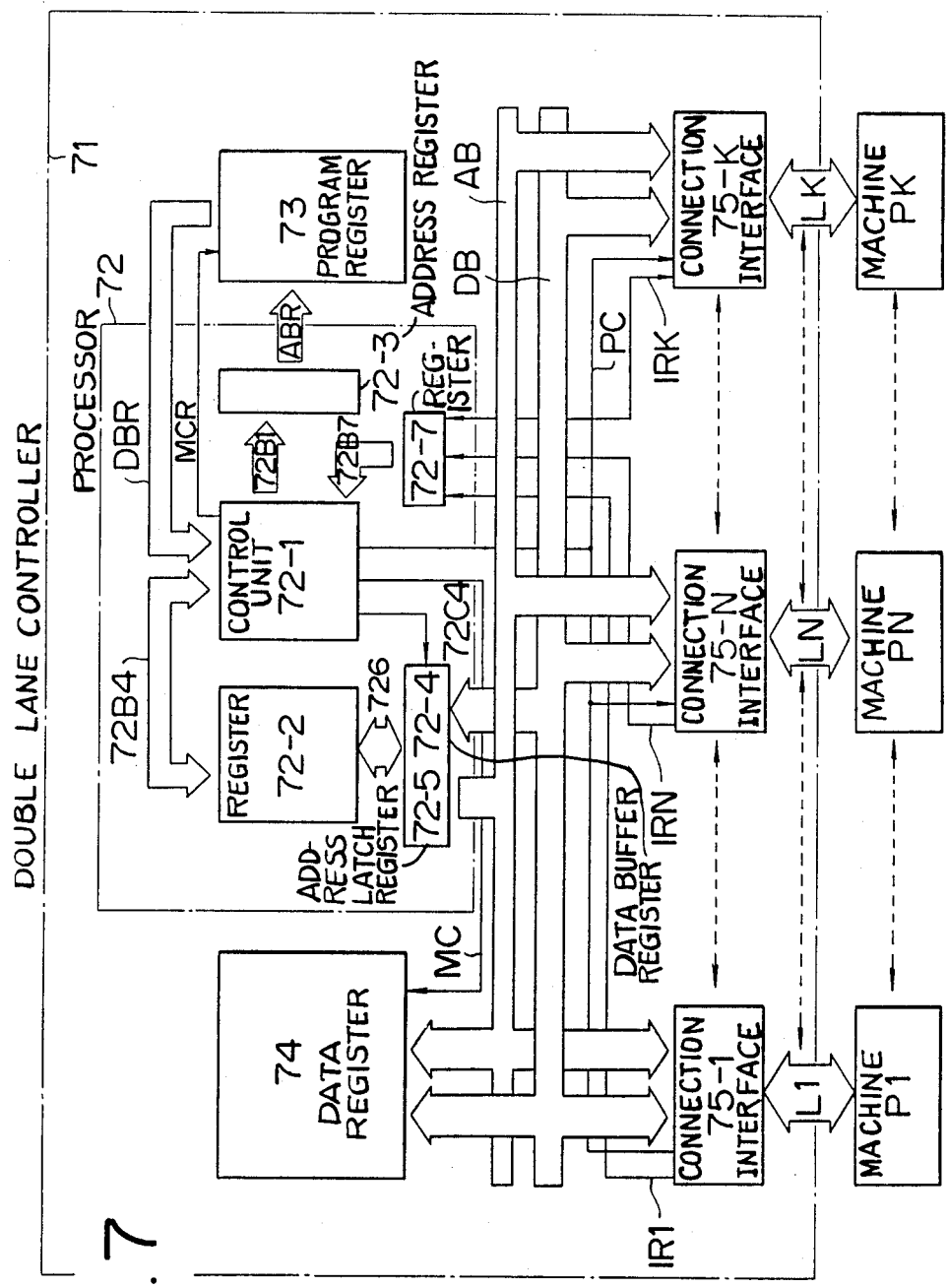
FIG. 7 illustrates the construction of a lane controller for both the punched card system and magnetic-card system, and the connection of the controller to machines to be controlled thereby.

FIG. 7 shows the construction of a double lane controller used in the present invention, and the connection of the controller to machines to be controlled thereby. Referring to the drawing, reference numeral 71 denotes the double lane controller as a whole. The double lane controller according to the invention comprises a processor 72, a program register 73 consisting of a nonvolatile memory element, a data register 74 consisting of a memory element capable of being rewritten in accordance with a controlling signal from the processor 72, connection interfaces 75-I-75-K for the machines P1, −PN, PK to be controlled, for example a punched card type pass delivery machine 31, a reader for a punched card type pass 34, a magnetic pass delivery machine 41, a reader for the magnetic pass 44, a receipt issuing machine 47, a toll indicator 46 and a vehicle discrimination 43 consisting of a weighing board and a plurality of photosensors. The machines P, ... PN, ... are connected with the corresponding interfaces 75-1, ... 75-K, respectively by means of disconnectable connectors, and the signals LI ... LN ... LK communicate with them.

The processor 72 comprises a control unit, a register 72-2, an address register 72-3, a data buffer register 72-4, an address latch register 72-5 and a register 72-7.

The decoding of the instruction program, the computation of toll on the basis of the vehicle type and other data, the control of the machines connected to the lane controller are carried out in the control unit 72-1. The register 72-2 consists of two registers, one for temporarily holding the computation results in the control unit 72-1 and some other data, and the other for receiving address data signals. The address register 72-3 is for storing the instructions selected from the programs in the program register. The address latch register 72-5 is for registering the data from the register 72-2 through a signal line 72-6. The register 72-7 is for holding the control demand interruption signal from the interfaces 75-1-75-K to which machines P1-PK are connected.

When a select signal 72B1 is sent from the control unit 72-1 to the address register 72-3, instruction codes are selected from the codes stored in program register 73 by an address signal ABR and a control signal MCR, and are read out by the control unit 72-1 through a data bus DBR. Signals 72B7 are sent from the register 72-2 to the control unit 72-1 and to the address register 72-3. Control signals are sent out to machines P1-PK from the control unit 72-1, after decoding of the instruction codes, logical decision and computation. Where signals 72B4 from the control unit 72-1 control the register 72-2, and signals 72C4 control the data buffer register 72-4 and the address latch register 72-5.

The signal AB on an address bus from the address latch register 72-5 is a signal for selecting a specific memory address in the data register 74, and for selecting a specific register and buffer in the connection interfaces 75-1-75-K. The signal DB is a signal on a data transfer bus between the processor 72 and data register 74. The signal MC is a signal from the control unit 72-1 for controlling the data register 74, and the control signal PC is a signal from the control unit 72-1 to select the data transfer direction between the processor 72 and the connection interfaces 75-, 75-K.

Figure 8:
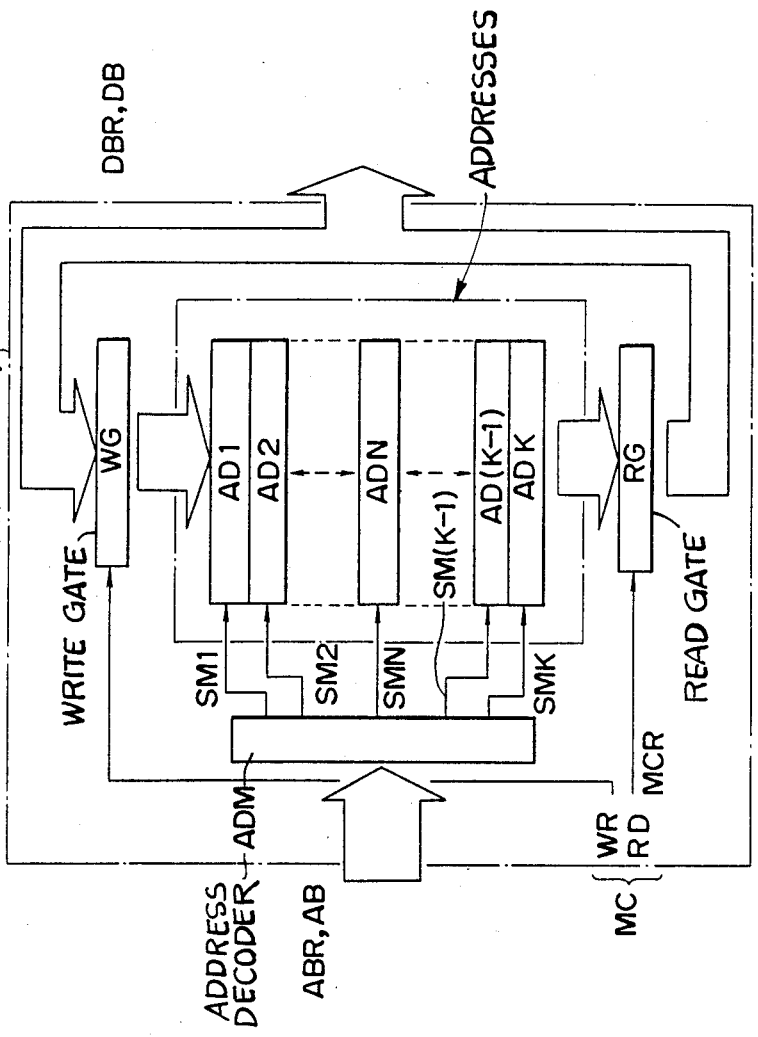
FIG. 8 is a block diagram illustrating the details of a program register and a data register in the double lane controller.

FIG. 8 shows the details of the program register 73 and data register 74. Reference letters AD1-ADK denote memory units or addresses thereof, which consist of such number of bits (usually 8 bits or 16 bits) that is peculiar to the processor, and which are selected by select output signals SM1-SMK from ADM, by which the contents of the addressing output ABR or address AB have been decoded.

Reference letters WG denote a write gate for the addresses AD1-ADK, which is controlled by a write signal WR from the processor 72, and which is adapted to read out on the data transfer bus DB the contents of addresses corresponding to memories selected by the select output signals SM1-SMK.

In the program register 73, in which no writing operation is conducted, a write gate WG and a write signal are not provided.

Reference letters RG denote a read gate adapted to read out the contents of the memory of the data transfer bus DB by a read signal MCR or RD and the select output signals SM1-SMK.

Figure 9:
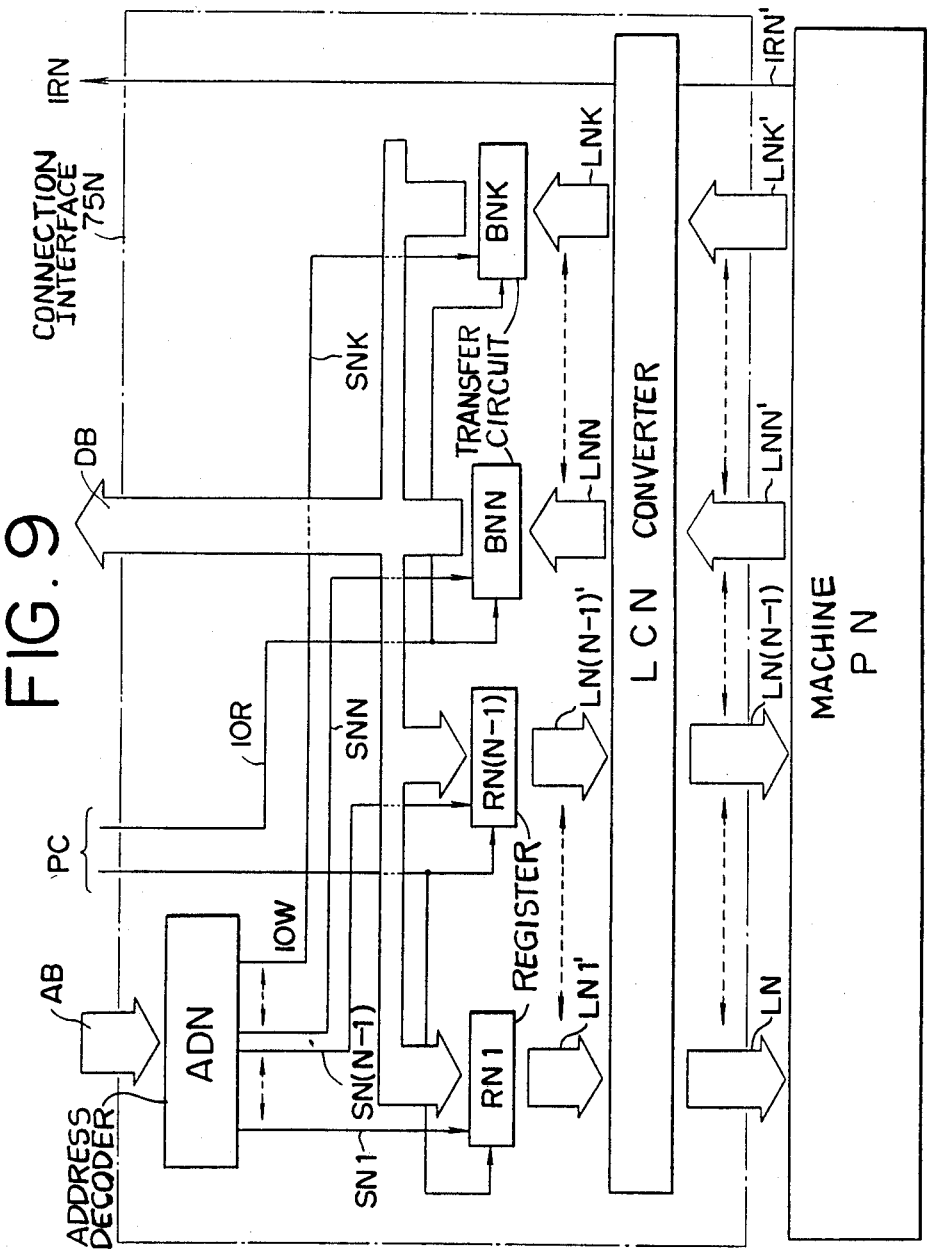
FIG. 9 is a block diagram illustrating the details of a connection interface of the double lane controller.

FIG. 9 illustrates a connection interface 75-N, which is one of the connection interfaces 75-1-75-K, and which is taken as an example thereof to show the contents of these connection interfaces formed in the same manner. The connection interface 75-N will now be described.

Reference symbols RN1-RN(N-1) denote registers adapted to be selected by register-selecting signals SN1-SN(N-1) from an address decoder ADN, by which the content of the address bus AB is decoded, memorize the content of the data bus DB by a write signal IOW, and output signals LN1'-LN(N-1)' for controlling the machine PN mentioned above.

Reference letters BNN-BNK denote transfer circuits adapted to be selected by buffer signals SNN-SNK, and transfer input signals LNN'-LNK' onto the data bus DB by a read signal IOR.

Reference letters LCN denote a converter adapted to convert input signals LN1'-LNK', IRN' into signals LN1-LNK, IRN, respectively, in such a manner that the signals LN1-LNK, IRN have signal levels peculiar to the double lane controller 71 and machine PN.

Reference letters LN denote the signals LN1-LN(N-1), LNN'-LNK', IRN' collectively.

FIG. 10 shows the construction of the double lane controller 71. Reference numeral 741 denotes a casing, 742 a circuit board housing rack adapted to house the circuit boards for the processor 72, program register 73, data register 74, and connection interfaces 75-1-75-K, L1C-LKC signal cables corresponding to L1-LK, respectively, C1'-CK' connectors provided in the connection interfaces 75-1-75-K and corresponding to the signal cables L1C-LKC, 743 a connector panel for the signal cables L1C-LKC connected to the machines P1-PK, 744 a power source unit, 745 a fuse, 746 power source display lamps, 747 a power switch, 748 a power supply cable extending from the power source unit 744 to the circuit board housing rack 742, and 749, 750 connectors for the cable 742.

FIGS. 11a and 11b show the construction of the circuit board housing rack 742. The housing rack 742 is provided on the rear surface thereof with a bus signal line 753, which consists of circuit board-inserting jacks 751, address bus AB, data bus DB, control signals PC, MC, and control demanding interruption signals IR-1-IRK, and a power source line 754 for supplying an electric current from the power source unit 744 to the circuit board housing rack 742 through the connector 749, power supply cable 748, connector 750, and power source cable 748'.

The circuit boards 752 constituting the double lane controller 71 are adapted to receive an electric current and bus signals through the jacks 751, 755.

A signal line for the addressing output ABR, data bus DBR and control signal MCR between the processor 72 and program register 73 is designated by a reference numeral 756.

In the case of a connection interface consisting of a plurality of circuit boards, the connection signals therefrom are bundled in one connector on the connector panel 743.

The operation of the tolling machine constructed as mentioned above will be described. The processor 72, which takes a leading role in the double lane controller 71 shown in FIG. 7, is adapted to select by the addressing output a series of program instructions written in the program register 73, read out the program instructions on the data bus DBR by the control signal MCR in the same manner as shown in FIG. 8, and decode and execute the instructions.

On the basis of the results, the bus signals AB, DB and control signals, PC, MC are outputted from the processor to control the machines P1-PK through the data register 74 and connection interfaces 75-1-75-N.

The processor 72 is adapted as mentioned above, to read the content of the program register 73, and carry out a predetermined processing operation in accordance therewith. Accordingly, the processor 72 is not subjected at all to the influence of variations in the content of a controlling operation.

Since the program register 73 holds a program, it is necessary that the contents thereof be changed in accordance with the variations in the contents of the controlling and processing operations. In order that the program in the register 73 can be changed easily, the register 73 is composed of a PROM (programmable read only memory), in which data are written with a private writing device, and in which the content is erased with ultraviolet rays. The capacity of the program register 73 is also increased and decreased due to the influence of variations in the contents of controlling and processing operations. However, this problem can be overcome if a selection signal from an address recorder, which is capable of increasing PROM by the chip, and a chip mounting socket are provided.

The data can be written in and read out from the data register 74 by a controlling operation of the processor 72 as shown in FIG. 8, and the data register 74 is usually used as a place for accumulating data therein and a working area (place for tentatively storing data generated in a processing step) for the processor 72.

The capacity of the data register 74 is increased and decreased in accordance with the content of a processing operation just as that in the program register 73. This problem can be dealt with in the same manner as in the program register 73.

The connection interfaces 75-1-75-K are natural parts of the machines controlled by the double lane controller 71. The operation of these connection interfaces will be described with reference to FIG. 8.

An output signal for controlling an operation of the machine PN is selected by register-selecting signals SN1-SN(N-1) from the address coder ADN, to be stored in the registers RN1-RN(N-1) by a writing signal IOW from the machine PC.

The output signal is varied by accessing the register again from the processor 72. Since the signals from the registers RN1-RN(N-1) have a level peculiar to the double lane controller 71, they are subjected to level conversion in the converter LCN, the resulting signals being outputted to the machine PN.

The data and state signals LNN'-LNK from the machine PN are subjected to level conversion in the converter LCN. The resulting signals are inputted as signals LNN-LNK into the transfer circuits BNN-BNK, and they are selected separately by a selecting signal from the address recorder ADN and the read signal IOR for the control signal BC to be transferred to the processor 72 by the data bus DB.

When it is necessary that the machine be controlled by the double lane controller 71, a control demanding interruption signal IRN' is outputted from the machine PN to be inputted into the machine PN in the controller 71, subjected to level conversion in the converter LCN, and stored as a control demanding interruption signal IRN in the register 72-7 in the processor 72. The registration of the signal IRN is detected by the control unit 72-1 by the transfer signal 72B7, and the necessary control operation is carried out thereby through the output and input mentioned above.

The circuits in the double lane controller 71 are set in the circuit board housing rack 742 as shown in FIGS. 10 and 11. The circuits are housed individually or in groups in the form of boards. Especially, the signals L1-LK for the machines P-1-P-K are led from the front panels of the boards in the connection interfaces 75-1-75-K to the connectors C1-CK on the connector panel 743 through the connectors C1'-CK' and cables LIC-LKC.

The bus signals AB, DB, control signals MC, PC and control demanding interruption signals IR1-IRK run as shown in FIG. 11a with a reference numeral 753 on the rear surface of the circuit board housing rack 742. Each of the circuit boards inserted in the circuit board housing rack 742 is capable of receiving the supply of these signals.

Therefore, even when the specifications of the machines P-1-PN are changed, or even when the machines P-1-PN are replaced by other machines, it does not have any influence on any parts of the tolling system except the relative connection interface, and the connector and cable belonging thereto. Accordingly, the machines can be modified and replaced by other machines easily.

FIGS. 12-16 illustrate the steps of replacing a punched-card system with a magnetic-card system.

The lane controller according to this invention is used as follows, for example, when P1 is a punched card type pass delivery machine 31, P2 is a reader for a punched card type pass 34, P3 is a magnetic pass delivery machine 41, P4 is a reader for a magnetic pass 44, P5 is a receipt issuing machine 47, P6 is a toll indicator 46 and P7 is a vehicle discriminator, these seven machines are connected with the seven interfaces 75-1, ..., 75-7.

Entrance toll gate:

At the beginning of the operation, the clerk in charge pushes the start button on the machine P3, then the lane controller 72 commences operation. When a vehicle enters the toll gate, the machine P7 discriminates the kind of vehicle. A signal corresponding to the vehicle type is sent from the machine to the data buffer register in the processor 72. If the system replacement has not yet begun, the clerk should push the button on the machine P1, then the machine P1 discriminates the vehicle type and sends a signal corresponding the kind of vehicle to rhe processor 72. The punched card type pass with the necessary data is issued to the driver of the vehicle. The data of the delivery of pass is stored in the processor 72. On the contrary, if the system replacement has begun or has ended, the clerk should push the button on the machine P3, then the signal corresponding to the vehicle type is sent from the machine P3 to the processor and a magnetic pass with the necessary data is delivered from the machine P3 under the control of the lane controller 71. Then the vehicle starts, and the data of the pass is stored in the processor 72.

At the end of the operation in both cases, the clerk pushes the end button on the machine P3 then the processor totalizes the data of the pass which has delivered in this operation, and transfers the data to the data processor, and the results are printed out.

Exit toll gate:

At the beginning of the operation, the clerk in charge pushes the start button on the machine P4, then the lane controller 72 commences operation. When a vehicle enters the toll gate, the clerk in charge receives the pass from the driver of the vehicle. If the pass is of a punched card type, the clerk inserts the pass into the machine P2, and the data on the pass is read out. The data are received and stored in the lane controller 71. The lane controller computes the toll on the basis of the vehicle type and the entrance toll gate, the toll is indicated on the machine P6. If the pass is of the magnetic type, the clerk inserts the pass into the machine P4, and the data on the pass is read out. The data are received and stored in the lane controller 71. The lane controller computes the toll on the basis of the vehicle type, the entrance toll gate and the other data, the toll is indicated on the machine P6.

The clerk receives the toll from the driver. If a receipt is demanded by the driver of the vehicle, the clerk pushes the receipt delivery button on the machine P5. The lane controller 71 receives the signal and sends data necessary for receipt to the machine P5, and the receipt is delivered from the machine P5, then the vehicle starts. At the moment, the vehicle type is sensed by the machine P7 and the data is stored in the register of the lane controller.

At the end of the operation, the clerk pushes the end button on the machine P4, then the processor totalizes the data of the pass which have received in this operation, and transfers the data to the data processor. The data are processed in the data processor, and the results are printed out.

After the completion of the system replacement, the machine P1 and P2 are removed from the booth.

On toll roads in general, which are connected to one another, a plurality of tollhouses stand, each of which has a plurality of entrances, exits, tollgates and booths, the number of each of which corresponds to the traffic volume of the tollhouse.

In FIGS. 12-16, tollhouses A, B, each of which has two gates and two booths at an entrance and an exit thereof, are shown by way of example. Reference symbols AE-1, AE-2 denote entrances of the tollhouse A, AX-1, AX-2 exits of the tollhouse A, BE-1, BE-2 entrances of the tollhouse B, and BX-1, BX-2 exits of the tollhouse B. Reference numeral 71 denotes double lane controllers, which have the same construction as the double lane controller 71 shown in FIG. 7, and which are adapted to be used at the entrance and exit of the tollhouses. In each of the double lane controllers 71, the connection interfaces 75-1-75-K, signals L1-LK, and PROM for the program register 73 can be provided and removed easily in a sustem-replacing step to be carried out on the basis of what is shown in FIG. 7.

Reference numerals 157 and 158 denote slips for the punched-card system and magnetic card system, respectively. The machines and cards shown in FIGS. 3-6 are represented by symbolic figures in FIGS. 12-16 for simplifying the description of the system-replacing operation.

The method of replacing a punched-card system with a magnetic-card system according to the present invention utilizing a double lane controller will be described with reference to FIGS. 12-16.

FIG. 12 is an arrangement diagram of machines in the punched-card system. The passes PC for the punched-card system, which are issued by the pass delivery machines 31 at the entrances AE-1, AE-2 of the tollhouse A are processed by the pass examining machines 34 at the exits BX-1, BX-2 of the tollhouse B.

Conversely, the passes PC for the punched-card system, which are issued by the pass delivery machines 31 at the entrances BE-1, BE-2 of the tollhouse B are processed by the pass examining machines 34 at the exits BX-1, BX-2 of the tollhouse B.

The weighing boards 32, 36 are adapted to detect the number of axles of a vehicle at the entrance and exit, and the results are compared with the contents of the pass PC on the slip 157 for the punched-card system. The pass PC for punched-card system is then inserted into the reader 34 for punched passes, and the toll is determined on the basis of a signal from the reader 34 by the exit calculator 39. The toll thus determined is displayed on the toll indicator 37, and a receipt is issued by the receipt issuing machine 35.

Figure 13:
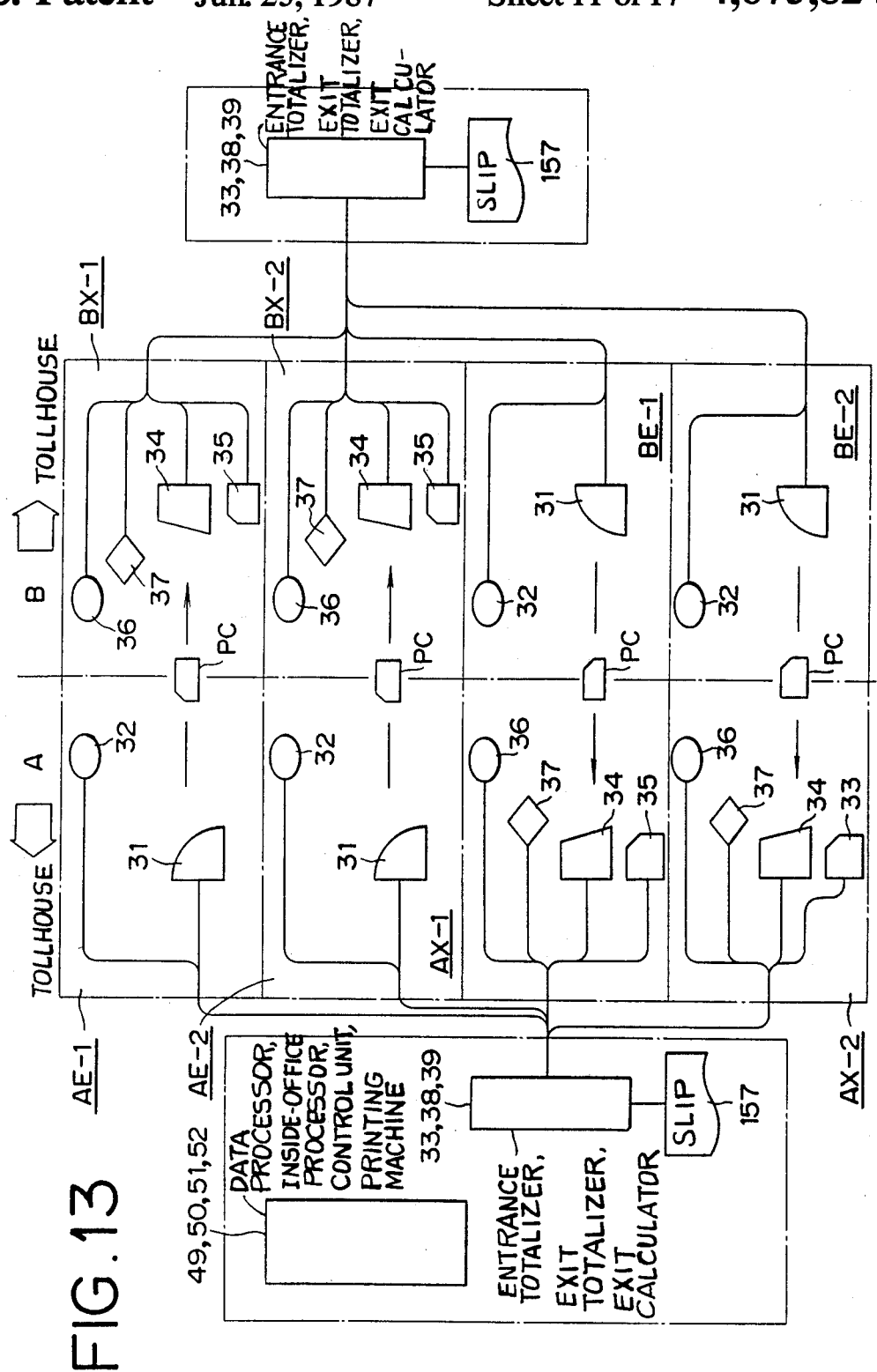

FIG. 13 shows the office machines for the magnetic-card system, i.e., the data processor 49, inside-office processor 50, control unit 51 for the inside-office processor 50 and printing machines 52, which are installed in the office in the tollhouse A with the entrance totalizer 33 and exit totalizer 38. The sequence of a pass-processing operation in this magnetic-card system is completely the same as that shown in FIG. 12.

FIG. 14-1 is an arrangement diagram, in which the double lane controller 71 for entrance and the double lane controller 71 for exit are installed with the entrance AE-2 and exit AX-2 among a plurality of gates and booths at the entrance and exits in the toll house A temporarily closed, and in which the machines around the booths are replaced by new machines, i.e., the weighing boards 32, 36 are replaced by the entrance and exit vehicle discriminators 43, 45; the toll indicator 37 by the toll indicator 46; and receipt issuing machine 35 by the receipt issuing machine 47, with the magnetic pass delivery machine 41 and the reader 44 for magnetic passes installed in each booth.

These newly-installed machines as well as the punched pass delivery machine 31, reader 34 for punched passes and receipt issuing machine 35 are connected as shown in the drawing to the double lane controllers 71, 71 at the entrance and exit so as to be controlled thereby.

The double lane controllers 71, 71 at the entrance and exit are also connected to the data processor 49. Owing to the combination of these machines and the inside-office processor 50, control unit 51 for the processor 50, and printing machine 52, a magnetic format slip 158 is prepared.

Consequently, a pass-processing operation is carried out in accordance with the magnetic-card system.

FIG. 14-2 illustrates the machines in the remaining entrance and exit AE-1, AX-1 of the tollhouse A, which have also been installed in place of the old ones in the same manner as shown in DIF. 14-1.

The entrance totalizer 23, exit totalizer 38 and exit calculator 39 in the tollhouse A, which are now unnecessary, are then removed.

FIG. 14-3 illustrates the machines in the tollhouse B, which have been newly installed in place of the old ones in the same manner as in the tollhouse A, in which the machines shown in FIG. 13 are replaced by new ones as shown in FIG. 14-2.

When the punched-card system is replaced by a magnetic-card system, the following work demands the greater part of the work period and much labor.

(1) Construction of power source equipment in the toll offices and booths, and engineering work for changing the capacity thereof. (In many cases, the power source equipment is installed additionally, and the capacity thereof is increased, in accordance with an increase in the scale of the tolling system.)

(2) Removal of machines in the toll offices and booths and around the booths.

(3) Installation of machines in the toll offices and booths.

(4) Chipping work around the booths for the installation of machines therearound, which include the vehicle discriminators 43, 45 at the entrances and exits and toll indicators 46.

(5) Replacement of signal and power cables between the toll office and booths, and between the booths and machines therearound, and the accompanying wiring and piping work.

The greater part of the control programs for the double land controllers 71, 71 at the entrance and exit, data processor 49, inside-office processor 50, and control unit 51 for the processor 50, which are shown in FIGS. 14-2 and 14-3, consist of control programs corresponding to the magnetic-card system, to which the software for the punched-card system used in the punched pass delivery machine 31 and reader 34 for punched passes is added. The pass PC for the punched-card system and the pass MC for the magnetic-card system are slightly different in the contents of information and format in use. The information obtained on the delivery and reading of a pass in the conventional system is processed by a predetermined correction method, so that substantially no problems occur when the time between the delivery of a pass and the reading thereof is short.

Figures 1, 15:
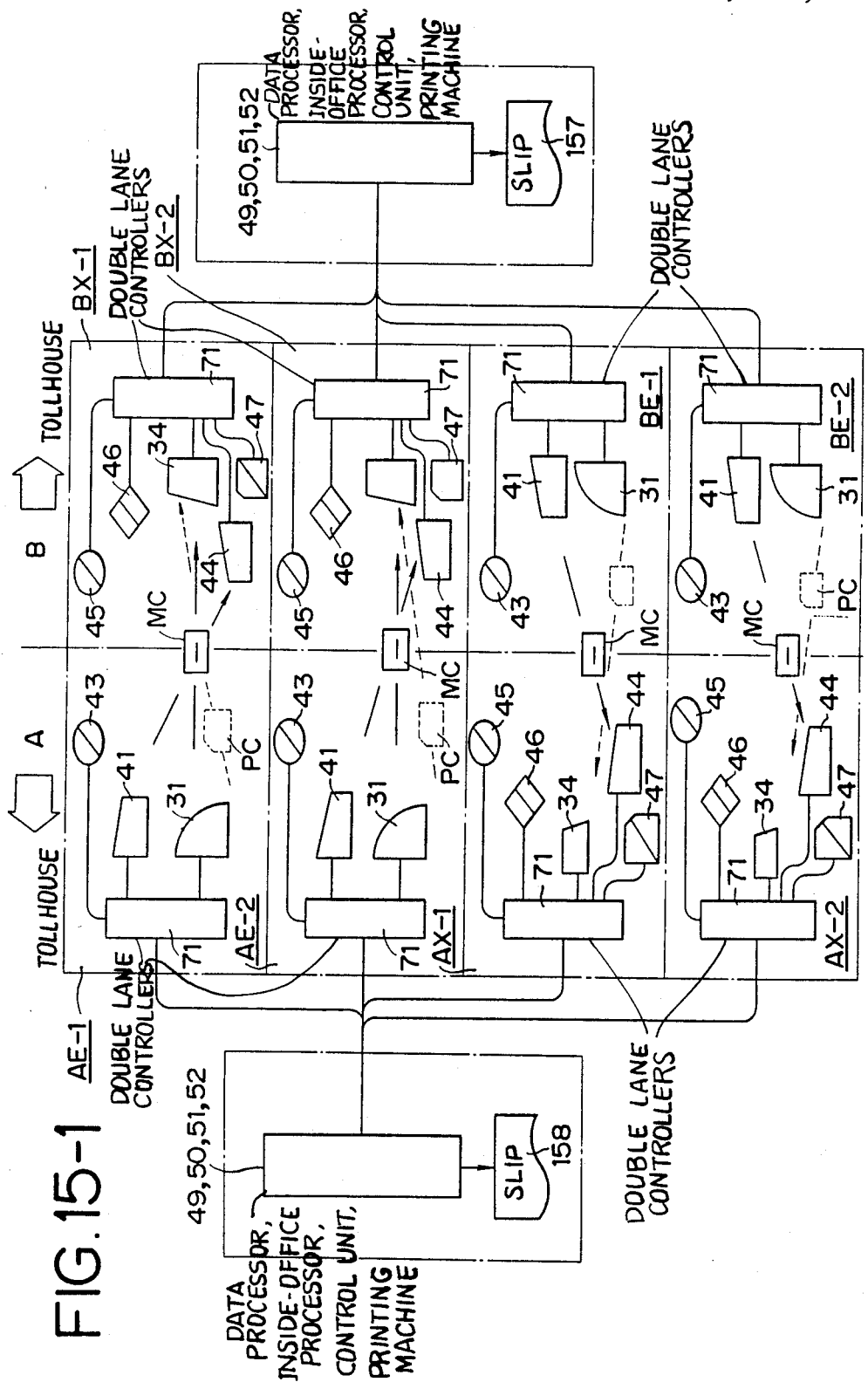
Figures 2, 15:
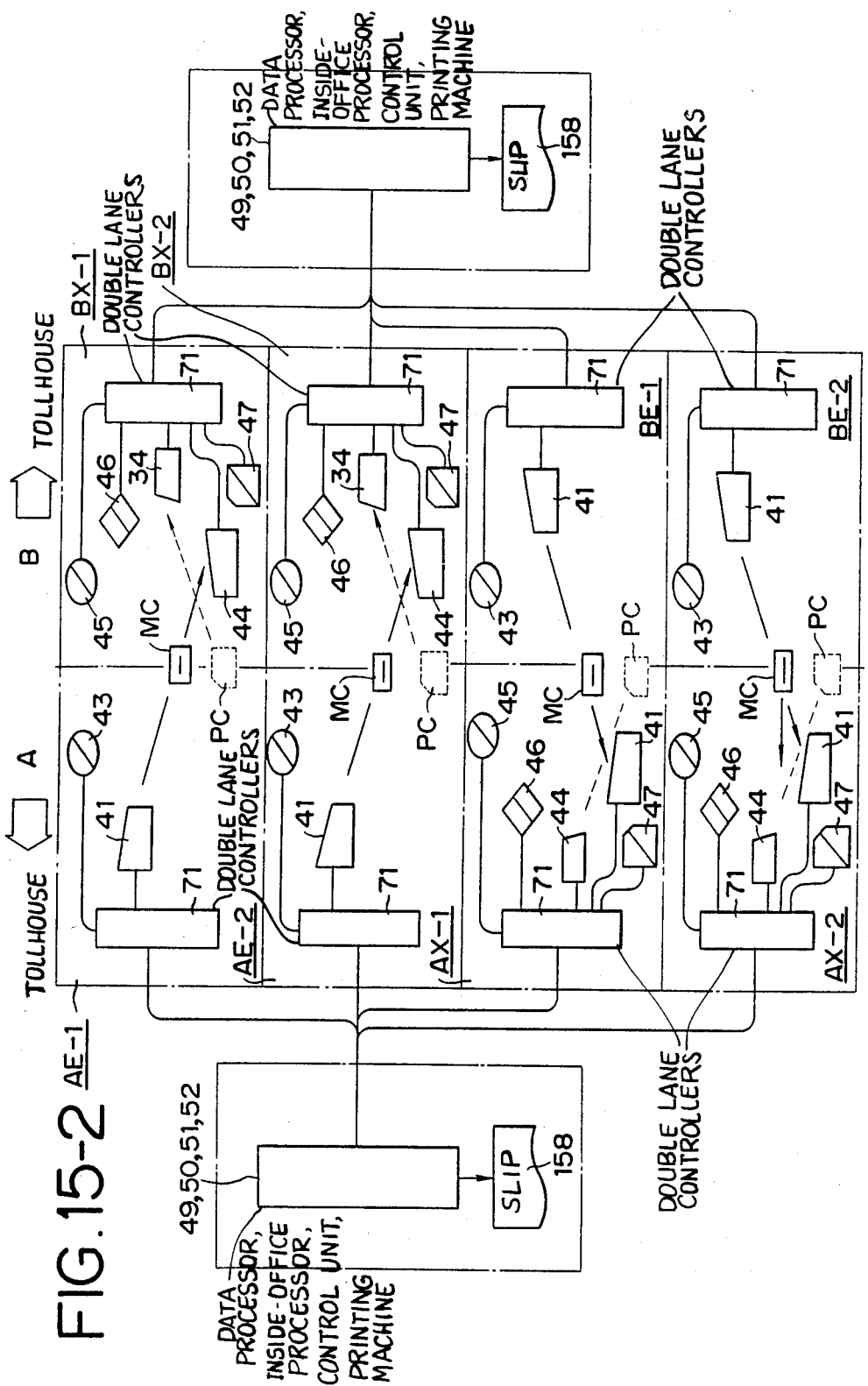

FIG. 15-1 illustrates the condition of a tollhouse as a whole, in which passes PC for the punched-card system, which are delivered by the punched pass delivery machine 34, are replaced wholly by passes MC for the magnetic-card system, which are delivered by the magnetic pass delivery machine 41, at predetermined time on a predetermined day after the abovementioned operations shown in FIGS. 14-1–14-3 have been completed.

The pass MC for the magnetic-card system is processed by the reader 44 for magnetic passes at the exit. A pass PC issued before the time of the replacement of the punched-card system by the magnetic-card system is processed by the reader 34 for punched passes.

FIG. 15-2 illustrate the condition of the tollhouse, from which the punched pass delivery machines 31, which have become unnecessary, have been removed.

Figure 16:
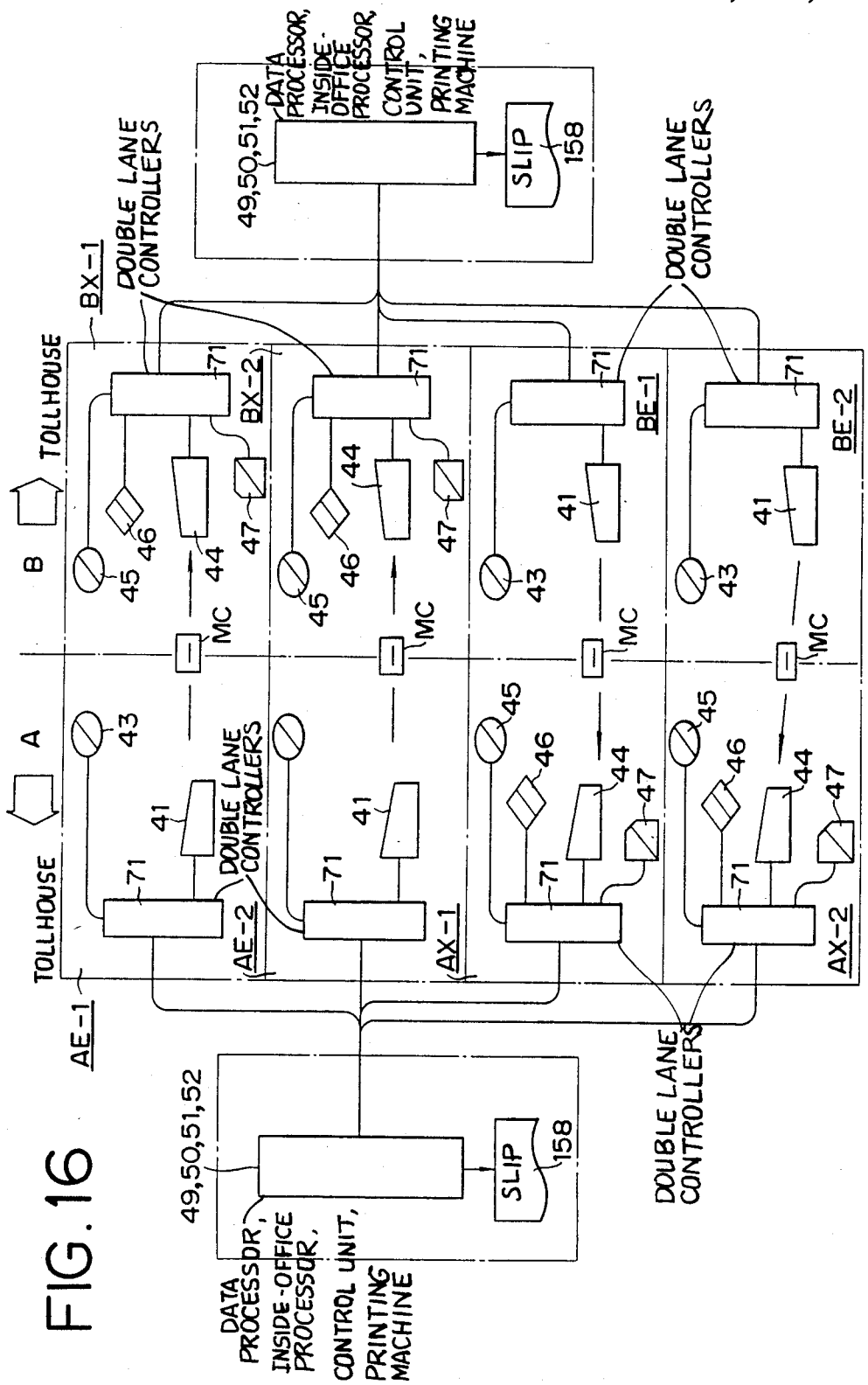

FIG. 16 illustrates the condition of the tollhouse, from which the readers 34 for punched passes, which became unnecessary, have been removed after a vehicle carrying a pass PC for the punched-card system left the toll road in question, to complete the machine replacement operation.

A series of machine replacement operations illustrated in FIGS. 15-1–FIG. 16 are completed as mentioned above, at such time that all vehicles carrying passes, which had been issued before the passes for the old system was switched to the passes for the new system, have left the toll road in question. The length of the time required for such machine replacement operation is extremely small, i.e., one day or not more than several days, though it varies depending upon the length of the toll road.

The replacing process can be summed up as follows:

First as shown in FIG. 12, punched card type pass delivery machines 31 and readers 34 for a punched card type pass are installed respectively at the entrance gates and the exit gates of all the toll gates (A,B), and the cards are treated by the entrance totalizer 33, the exit totalizer 38 and the exit calculator 39.

Next as shown in FIG. 13, the data processors 49, inside-office processor 50, control unit 51 for the inside-office processor and printing machine 52 are installed in some of the tollgates (A).

Thirdly, as shown in FIG. 14, the double lane contoller 71 for entrance and the double lane controller for exit are installed in the tollgate (A). The double lane controllers are connected with the magnetic pass delivery machines 41, the vehicle discriminators 43, 45, the readers 44 for magnetic passes, the toll indicators 46, the receipt issuing machines 47, as well as with the punched card type pass delivery machines 31 and readers for a punched card type pass. Thus, both of the magnetic pass MP and punched card type pass PC can be read at this tollgate (A), but the magnetic pass MP can not be read at the other tollgates (B). Consequently, only the punched card type pass is issued from any one of the tollgates, however newly installed machines are used in this step.

Finally, as shown in FIG. 15, when all the toll gates have been provided with the double lane controllers 71 both of the magnetic card and the punched card type passes can be bread at all of the tollgates. After this, the punched card type pass system is replaced by the magnetic card system simultaneously at all of the tollgates.

When the double lane controller, which is capable of connecting and controlling the pass delivery machine and reader for passes for both the punched-card system and magnetic-card system, and which can be formed by adding comparatively simple functions to a conventional lane controller, is installed in each booth in the entrance and exit of the tollhouse to carry out the machine replacement operations in accordance with the above-mentioned procedure, the following advantageous effects can be obtained.

(1) The length of time, during which both passes for the punched-card system and passes for the magnetic-card system are used is extremely small. The ill effect of a decrease in the pass-processing cycle time on the utilizers, which decrease is liable to occur due to the processing of two types of passes by different machines at the exit, can be prevented.

(2) An increase in the operational burden on the clerks can be prevented for the same reasons included in Item (1) above.

(3) The machines in each tollhouse can be replaced by new ones with the lanes closed in sequence. The replacement of the machines causes substantially no trouble in the traffic.

(4) Since the double lane controller is used, it is unnecessary to install machines of two systems in the booths. This allows the limited spaces in the booths to be used efficiently.

(5) This method can be adapted freely in the future to a machine replacement operation similar to that described above.

The present invention described above provides a method of replacing one tolling system with another for toll roads, having the steps of installing terminals in booths at an entrance gate, each of which terminals is adapted to issue a pass, on which the entrance information including a tollgate number and a type of a vehicle is recorded, installing terminals in booths at an exit gate, which terminals are adapted to read the information on the pass, calculating the toll on the basis of the information on the pass read by the terminal at the exit gate, and processing the results of the calculation by means of a data totalizer provided independently, the method comprising the steps of installing controllers for replacing an old pass-producing system with a new pass-processing system at the entrance and exit gates, each of which controllers are capable of controlling old and new terminals simultaneously, connecting the old and new terminals to the controllers, replacing the pass issuing from the old type pass by the terminals for the old system at the entrance gate to the new type passes by the terminals for the new system simultaneously after completion of installation of all terminals and finally removing the terminals for the old system at the entrance and exit gates. Namely, the present invention provides a method of replacing a tolling system for toll roads, which permits processing both old and new passes without any trouble in a transition period, in which old passes are shifted to new passes, and in which both old and new passes are used; installing new machines sequentially, to prevent the use of old and new passes from causing a decrease in the pass-processing efficiency, and prevent the utilizers from feeling inconvenience; and carrying out the replacement of the tolling system without completely closing the tollhouses and without causing any trouble in the traffic on the toll road.

The present invention is not, of course, limited to the above-described embodiment; it may be modified in various ways within the scope of the appended claim.

We claim:

1. A method of replacing a conventional punched card first tolling system for a toll road with a new magnetic card second tolling system where the toll road includes entrance gates and exit gates with booths at the entrance gates and exit gates through which vehicles using the toll road proceed, providing first terminals and second terminals in the booths at the entrance gates and the exit gates with the first terminals at the entrance gates issuing a punched card as a pass and with the second terminals at the entrance gates issuing a magnetic card as a pass with the issued punched card passes and magnetic card passes having recorded thereon entrance information for a vehicle passing through the entrance gates including a toll gate number and a type of vehicle, processing, collecting and storing the information recorded at the entrance gates in a data totalizer with the first terminals at the exit gates reading the information on a punched card pass and the second terminals at the exit gates reading the information on a magnetic card pass, calculating the toll on the basis of the information on the pass read by one of the first and second terminals at the exit gate, and processing, collecting and storing the results of the calculation by means of the data totalizer, arranging the first terminals at the entrance gates for issuing passes in the first tolling system and the second terminals for issuing passes in the second tolling system, arranging the first terminals at the exit gates for processing the punched card passes and the second terminals at the exit gates for processing the magnetic card passes and wherein the replacement of the first tolling system with the second tolling system includes installing a controller including a processor in each booth at the entrance and exit gates and interconnecting the controller to the first terminal and to the second terminal in the booth with the controller controlling the first terminal and the second terminal simultaneously, before commencing replacement of the first tolling system with the second tolling system using the controller for controlling the first terminal and when a vehicle enters the entance gate discriminating the vehicle type and through the processor and first terminal issuing a punched card pass, during the replacement of the first tolling system with the second tolling system when a vehicle enters the entrance gate discriminating the vehicle type and through the processor and second terminal issuing a magnetic card pass, during the replacement of the first tolling system with the second tolling system at the exit gates receiving either a punched card pass or magnetic card pass and discriminating in the controller the type of pass received and utilizing the corresponding first terminal or second terminal for determining the amount of the toll, after completing the installation of all of the first and second terminals and the controllers, replacing the issuance of the passes by the first terminals of the first tolling system with the second terminals of the second tolling system and issuing only the magnetic card passes, and finally removing the first terminals of the first terminal system at the entrance and exit gates.

* * * * *